(12) United States Patent
Ahn et al.

(10) Patent No.: US 10,180,229 B2
(45) Date of Patent: Jan. 15, 2019

(54) LIGHTING UNIT FOR VEHICLE

(71) Applicant: LG INNOTEK CO., LTD., Seoul (KR)

(72) Inventors: Kyoung Soo Ahn, Seoul (KR); Jeong Oh Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 213 days.

(21) Appl. No.: 14/653,089

(22) PCT Filed: Dec. 17, 2013

(86) PCT No.: PCT/KR2013/011707
§ 371 (c)(1),
(2) Date: Jun. 17, 2015

(87) PCT Pub. No.: WO2014/098436
PCT Pub. Date: Jun. 26, 2014

(65) Prior Publication Data
US 2015/0338048 A1 Nov. 26, 2015

(30) Foreign Application Priority Data

Dec. 17, 2012 (KR) .......... 10-2012-0147664
Dec. 17, 2012 (KR) .......... 10-2012-0147665
Dec. 17, 2012 (KR) .......... 10-2012-0147865

(51) Int. Cl.
*G02B 6/00* (2006.01)
*F21S 8/10* (2006.01)
(Continued)

(52) U.S. Cl.
CPC ......... *F21S 48/2243* (2013.01); *F21S 43/239* (2018.01); *F21S 43/245* (2018.01);
(Continued)

(58) Field of Classification Search
CPC .............. F21S 48/2243; F21S 48/2268; G02B 6/0073; G02B 6/0091
See application file for complete search history.

(56) References Cited

U.S. PATENT DOCUMENTS

| 7,537,368 B2 | 5/2009 | Mizuyoshi |
| 8,684,587 B2 | 4/2014 | Kim et al. |
| 2006/0002146 A1* | 1/2006 | Baba .................. G02B 6/0021 362/613 |

(Continued)

FOREIGN PATENT DOCUMENTS

| CN | 1716042 | 1/2006 |
| CN | 101495799 | 7/2009 |

(Continued)

OTHER PUBLICATIONS

International Search Report dated Apr. 28, 2014 issued in Application No. PCT/KR2013/011707.
(Continued)

*Primary Examiner* — Sean Gramling
*Assistant Examiner* — Gerald J Sufleta, II
(74) *Attorney, Agent, or Firm* — KED & Associates, LLP

(57) ABSTRACT

Provided is a lighting unit for a vehicle capable of implementing surface light emission from a single light emitting surface. The light unit can function to implement a light emitting region in which at least two light colors are displayed or different light colors are implemented, or to locally emitting light.

18 Claims, 14 Drawing Sheets

(51) Int. Cl.
*F21S 43/239* (2018.01)
*F21S 43/245* (2018.01)
*F21V 8/00* (2006.01)

(52) U.S. Cl.
CPC ......... *G02B 6/0021* (2013.01); *G02B 6/0036* (2013.01); *G02B 6/0051* (2013.01); *G02B 6/0068* (2013.01); *G02B 6/001* (2013.01); *G02B 6/0073* (2013.01); *G02B 6/0076* (2013.01); *G02B 6/0083* (2013.01)

(56) References Cited

U.S. PATENT DOCUMENTS

| | | | | |
|---|---|---|---|---|
| 2010/0002169 | A1* | 1/2010 | Kuramitsu | G02B 6/0021 349/65 |
| 2011/0013376 | A1* | 1/2011 | Kim | G02B 6/0021 362/97.1 |
| 2011/0235308 | A1* | 9/2011 | Kang | G02B 6/0068 362/97.2 |
| 2011/0242453 | A1* | 10/2011 | Van De Ven | G02B 6/0068 349/62 |
| 2011/0261290 | A1* | 10/2011 | Kim | G02B 6/0021 349/64 |
| 2011/0280045 | A1* | 11/2011 | Baek | G02B 6/0091 362/612 |
| 2013/0039091 | A1* | 2/2013 | Choi | G02B 6/0021 362/609 |

FOREIGN PATENT DOCUMENTS

| | | | | |
|---|---|---|---|---|
| CN | 101956928 | | 1/2011 | |
| CN | 102200659 | | 9/2011 | |
| CN | 102759052 A | * | 10/2012 | ....... G02F 1/133602 |
| JP | 2003-187623 A | | 7/2003 | |
| JP | 2005-285667 A | | 10/2005 | |
| JP | 2005-353599 A | | 12/2005 | |
| JP | 2007-155791 A | | 6/2007 | |
| KR | 10-2012-0085378 A | | 8/2012 | |

OTHER PUBLICATIONS

Chinese Office Action (with Full English Translation) dated Feb. 27, 2017 issued in Application No. 201380072847.4.

* cited by examiner

Fig. 1
PRIOR ART
(a)
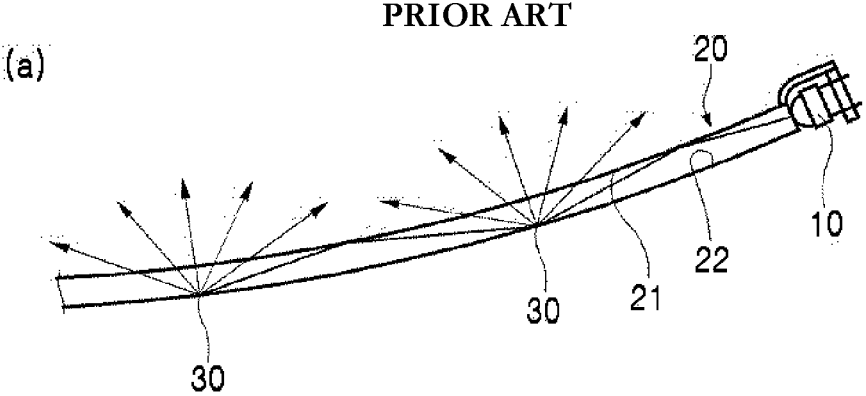
(b)
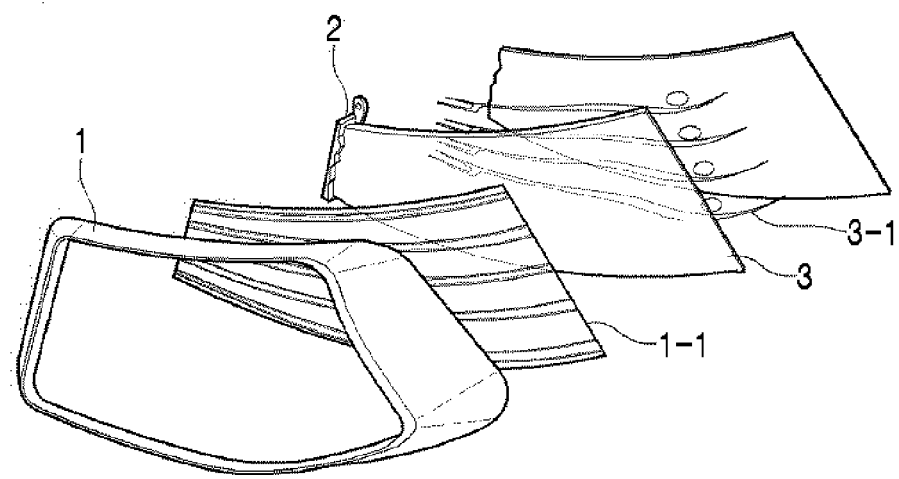

[Fig. 2]

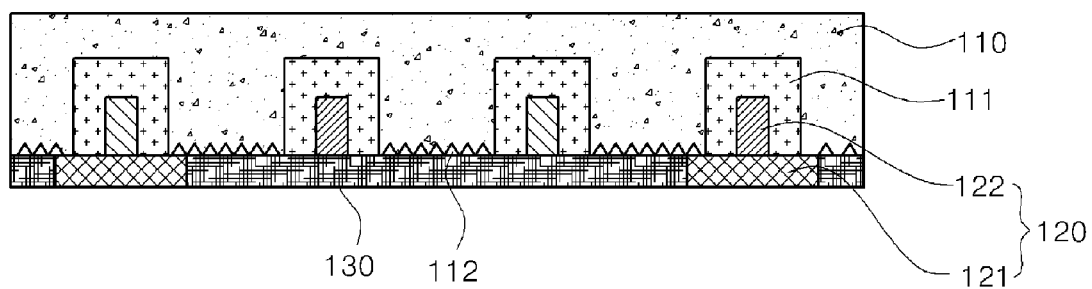
[Fig. 5]

[Fig. 6]
(a)
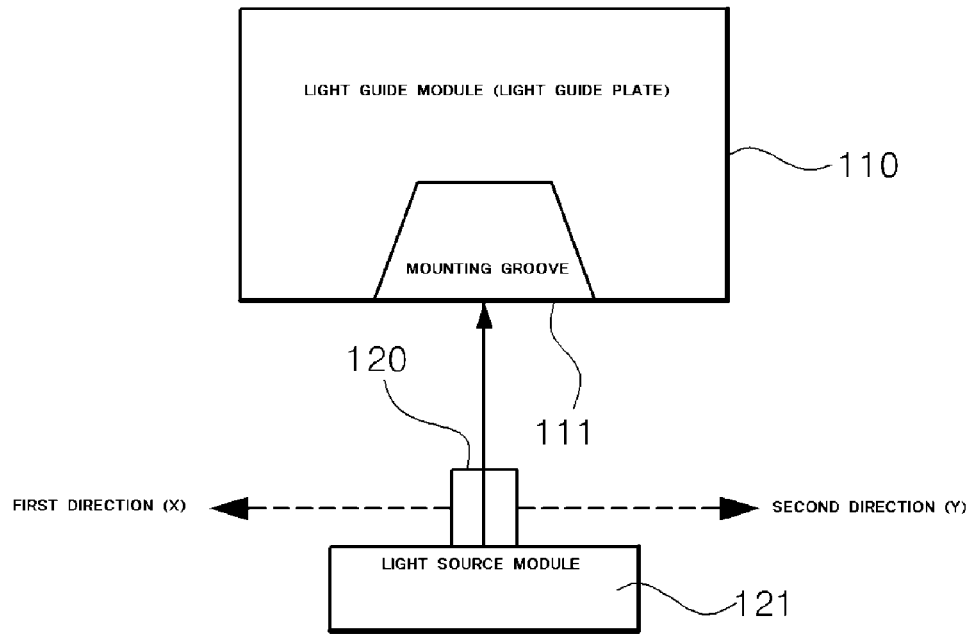
(b)
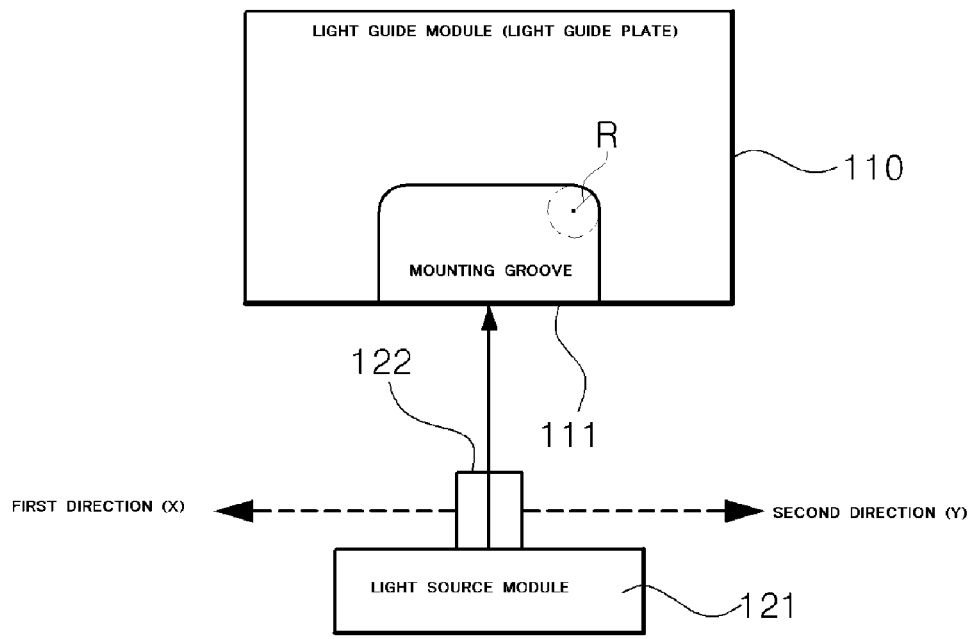

[Fig. 7]
(a)
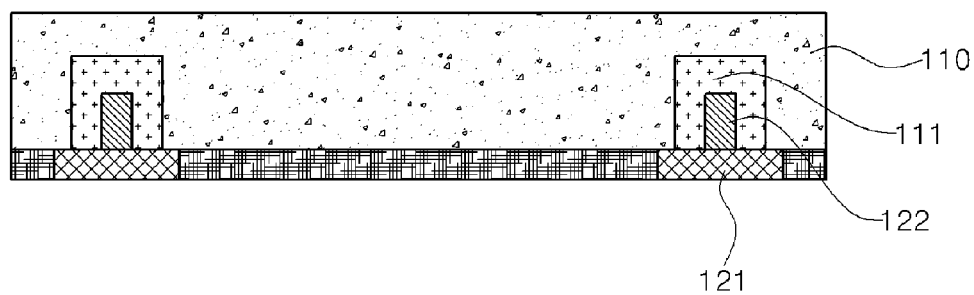
(b)
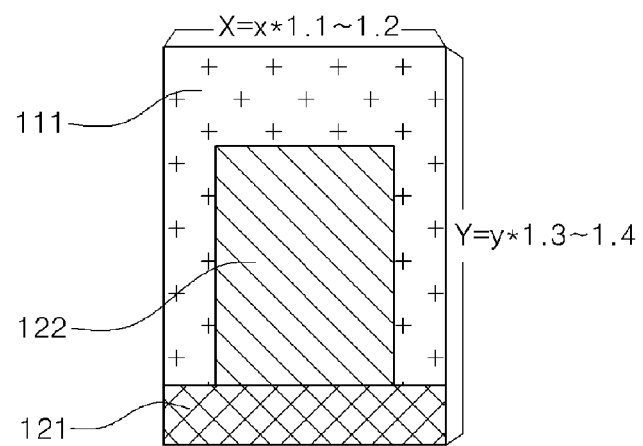

[Fig. 8]
(a)
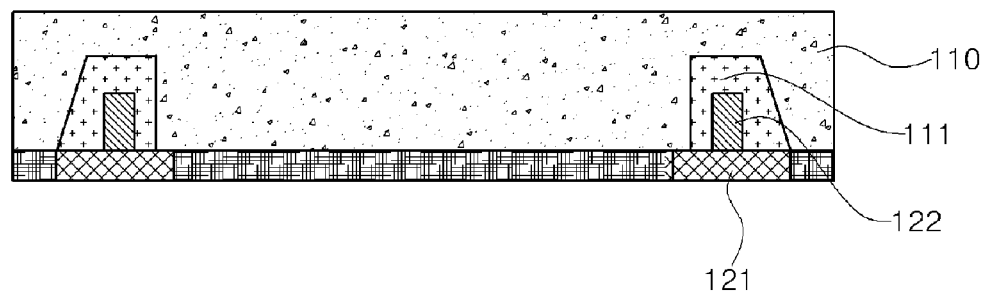
(b)
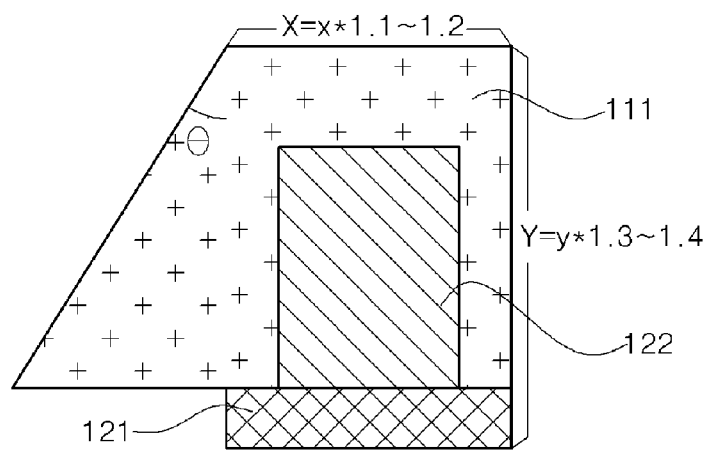

[Fig. 9]
(a)
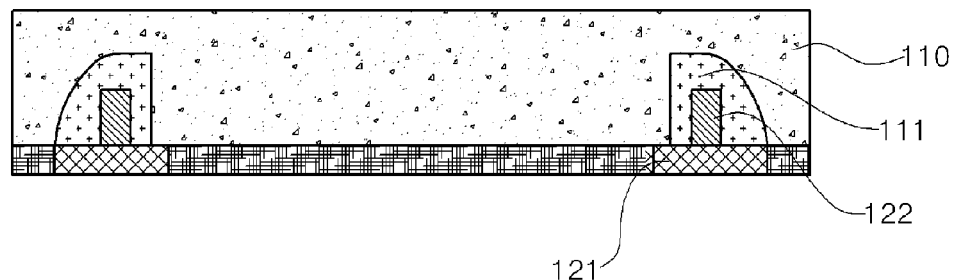
(b)
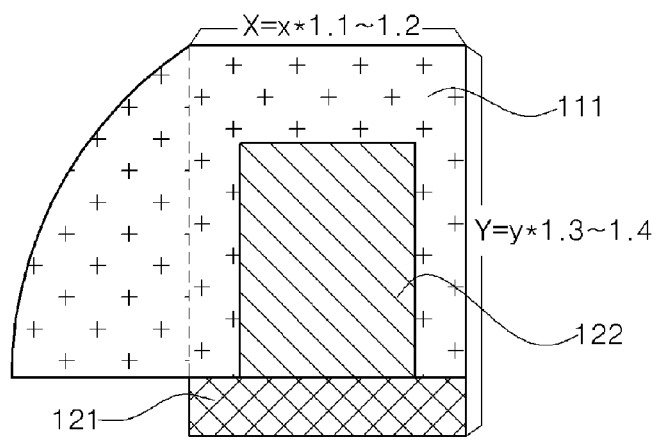

[Fig. 10]
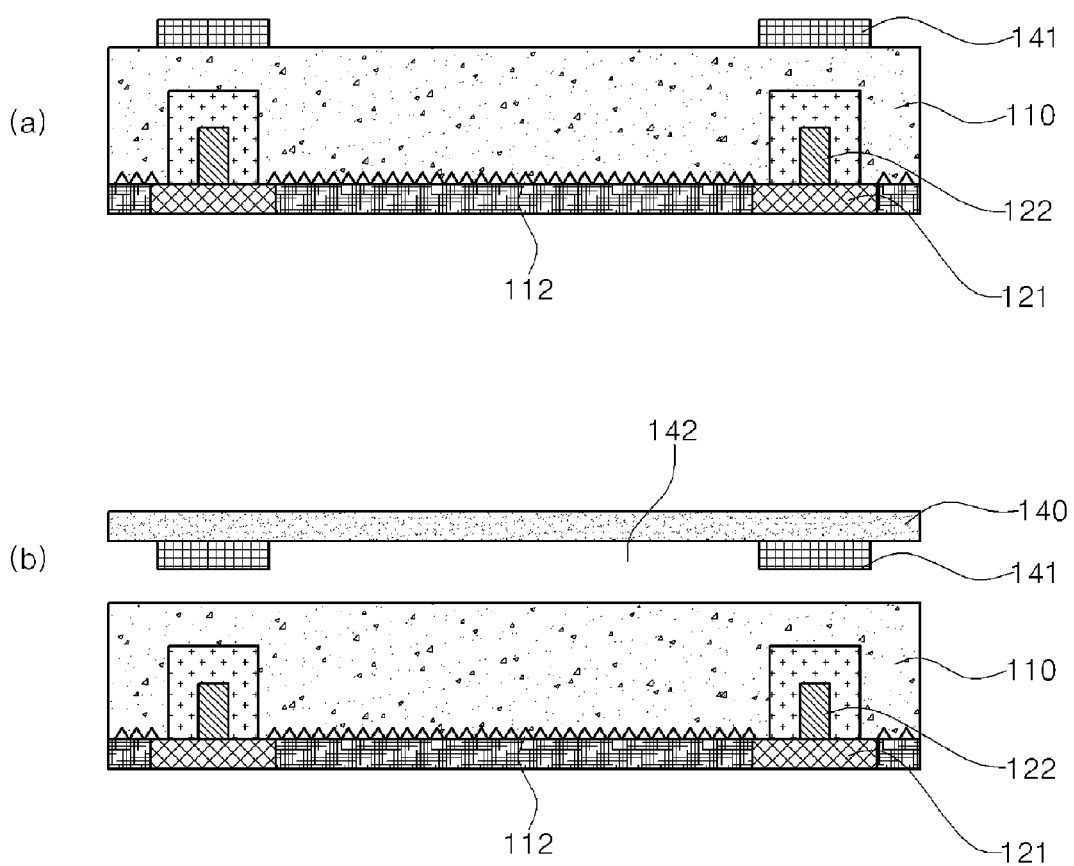

[Fig. 11]
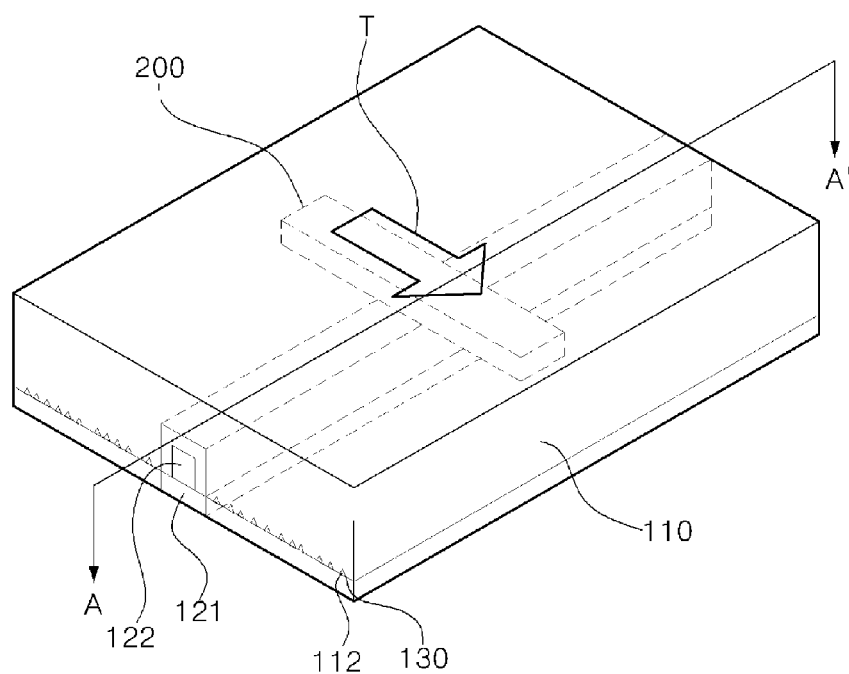
[Fig. 12]
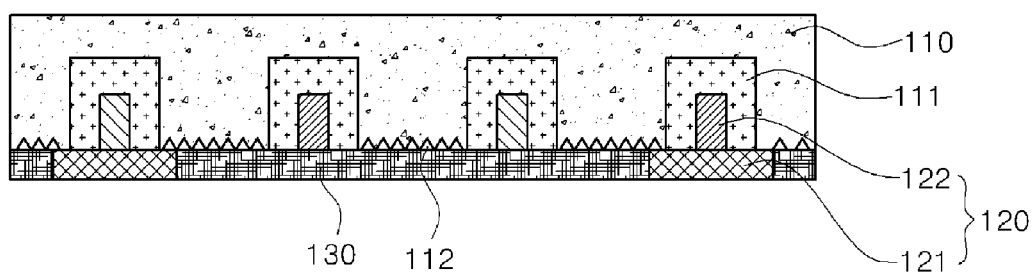

[Fig. 13]
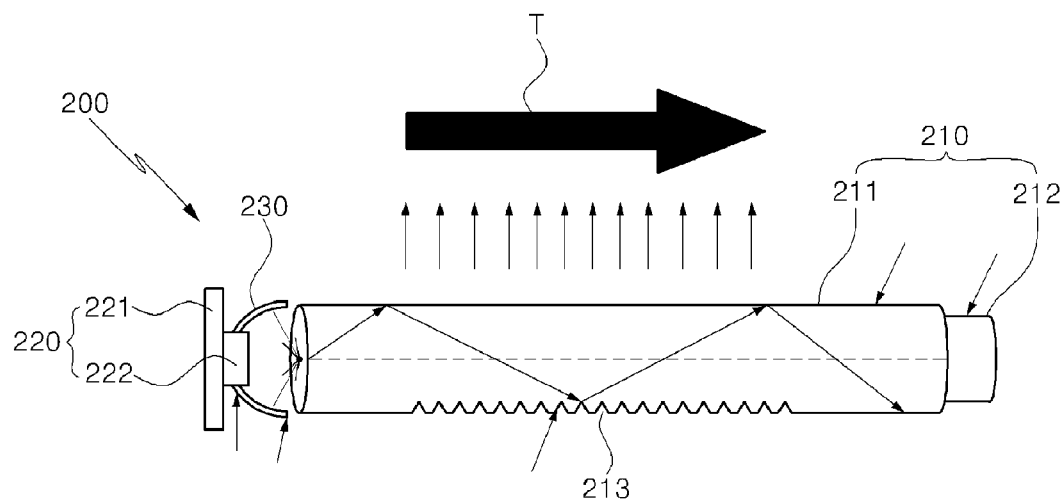
[Fig. 14]
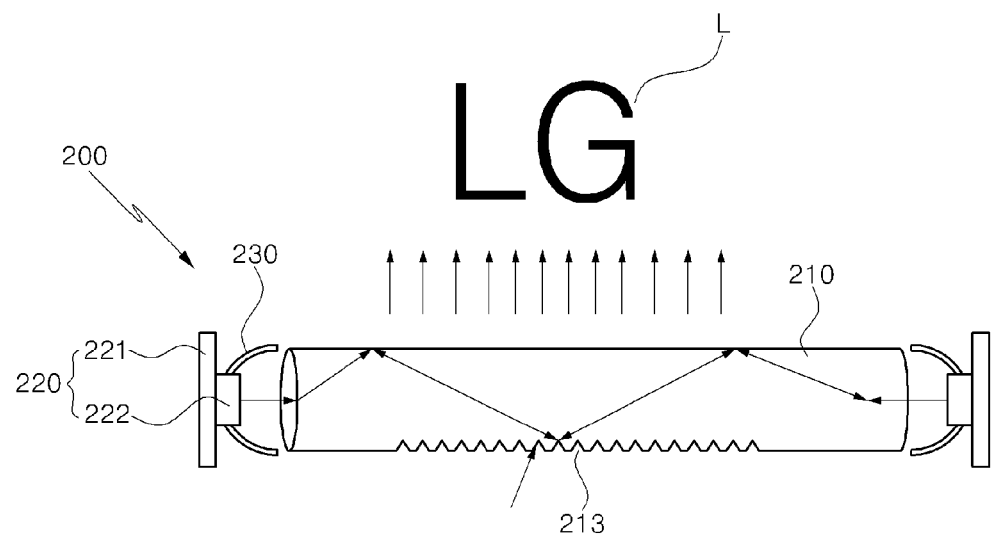

[Fig. 15]
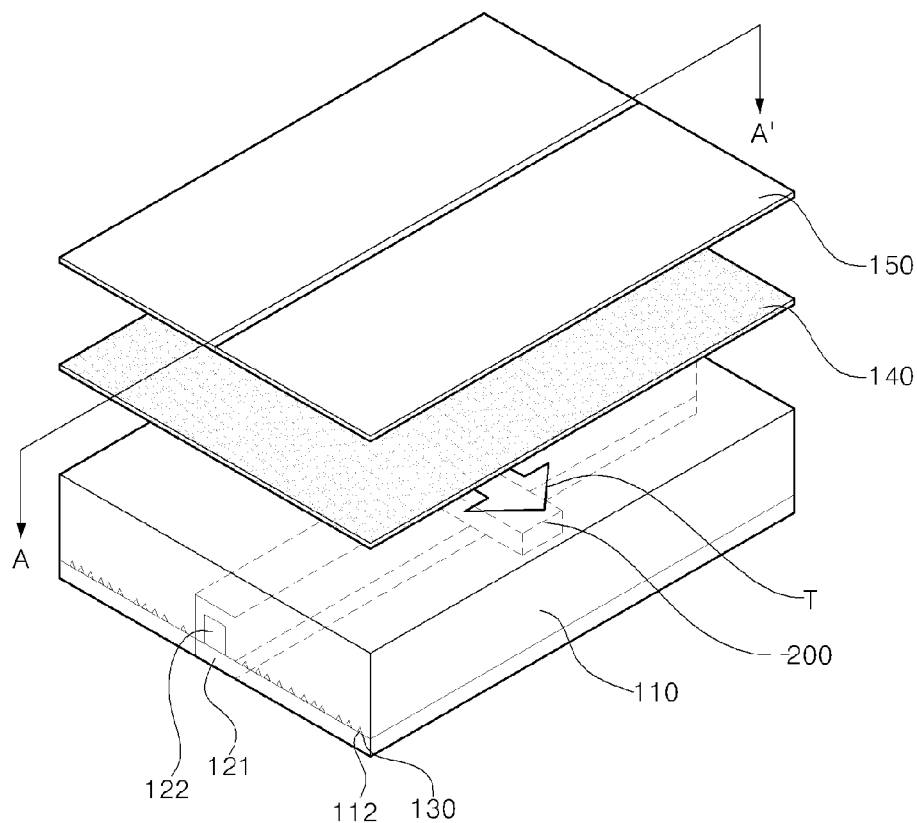
[Fig. 16]
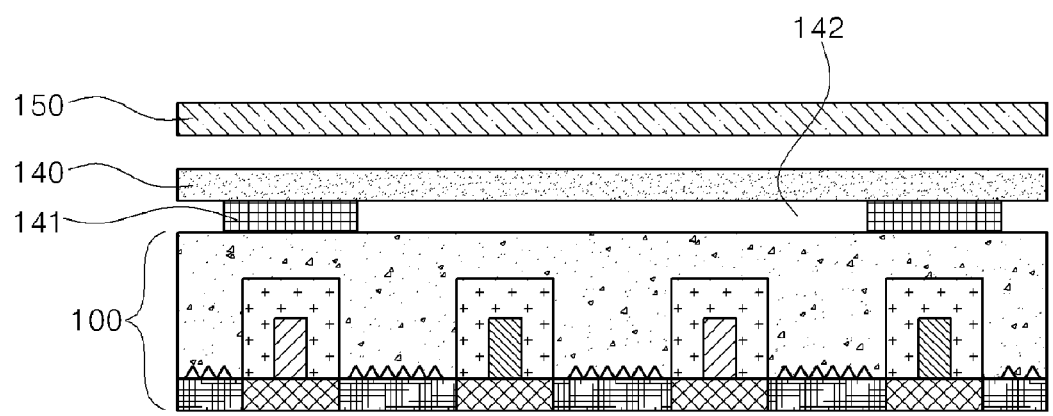

[Fig. 17]
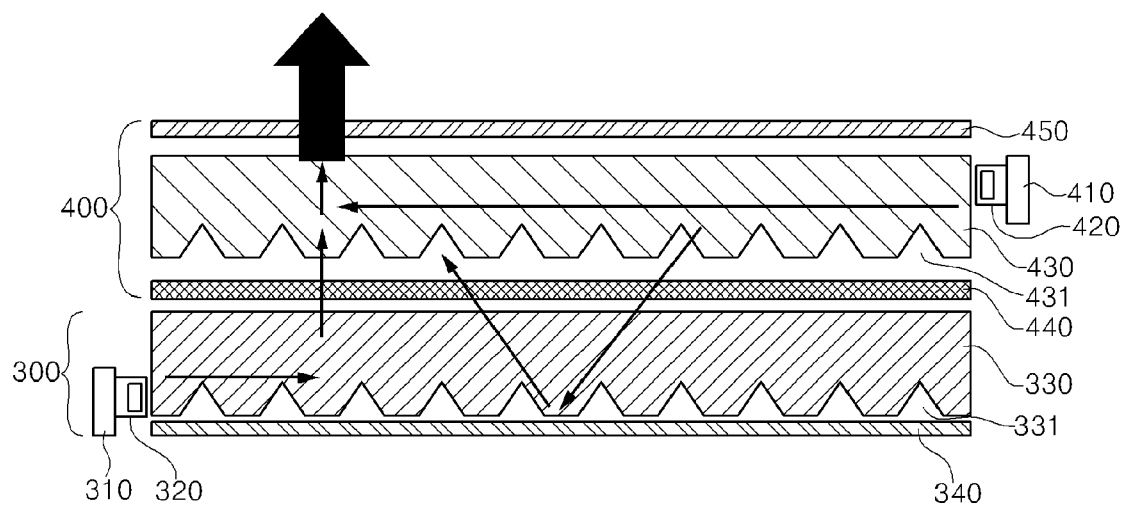
[Fig. 18]
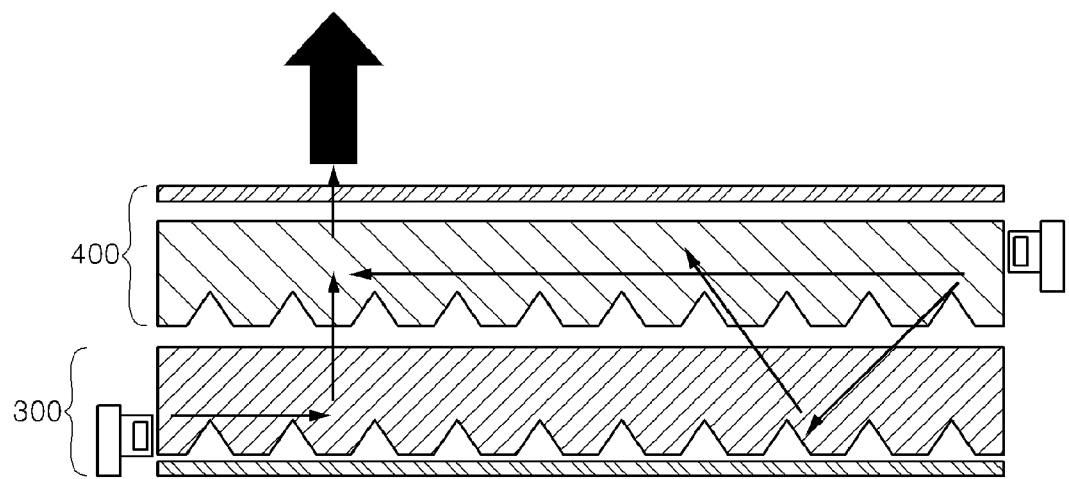

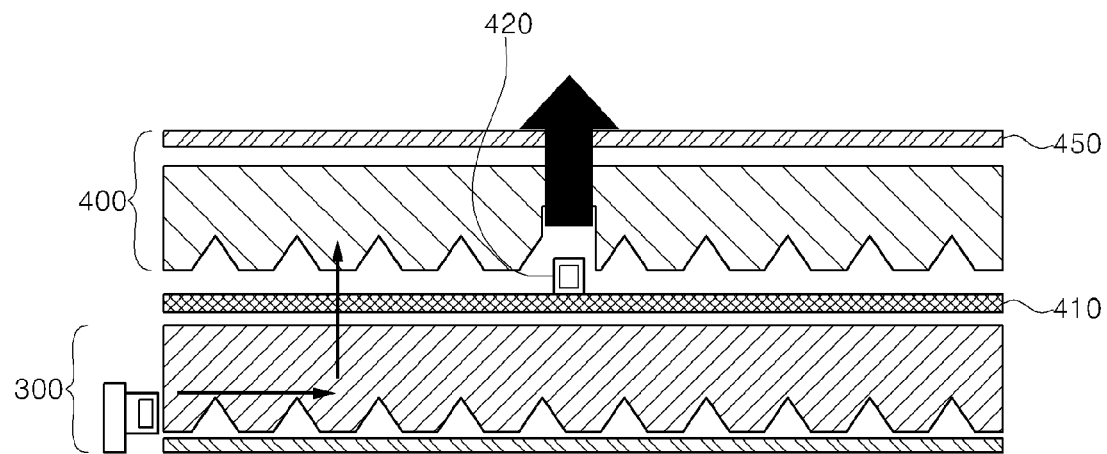
[Fig. 19]
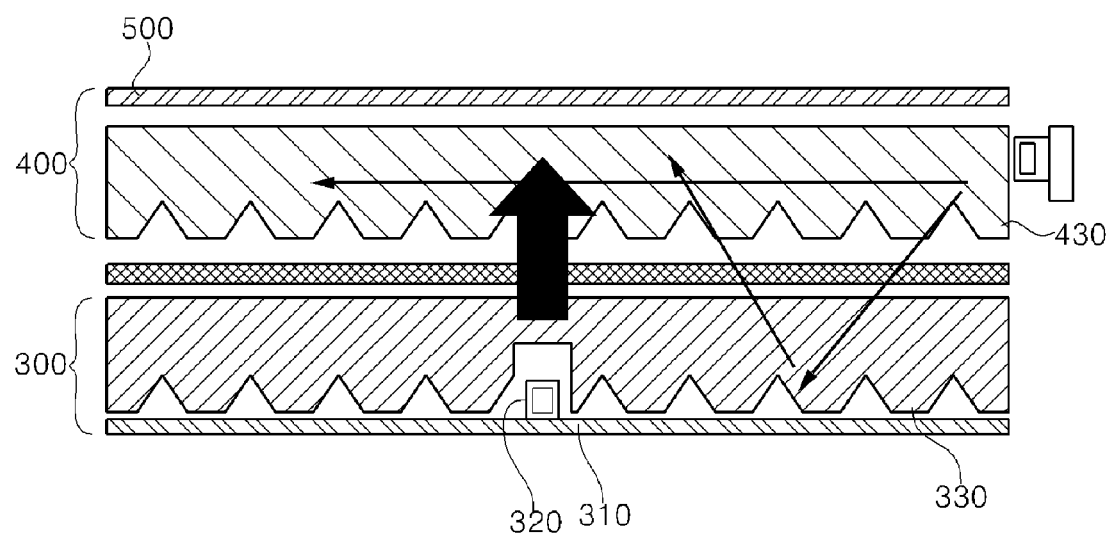
[Fig. 20]

LIGHTING UNIT FOR VEHICLE

CROSS-REFERENCE TO RELATED PATENT APPLICATIONS

This application is a U.S. National Stage Application under 35 U.S.C. § 371 of PCT Application No. PCT/KR2013/011707, filed Dec 17, 2013, which claims priority to Korean Patent Application Nos. 10-2012-0147664, 10-2012-0147665, and 10-2012-0147865, each filed Dec 17, 2012, whose entire disclosures are hereby incorporated by reference.

TECHNICAL FIELD

Embodiments of the present invention relate to a lighting unit, and a surface light source applied to lighting for a vehicle.

BACKGROUND ART

A lighting unit in which various light sources used in electronic equipment are utilized has been implemented in such a manner as to increase light efficiency by utilizing an appropriate light source for each property of the electronic equipment.

Even though a lighting unit, which has been recently used in electronic equipment, is a backlight unit applied to a flat display, the lighting unit may be variously applied to an indoor lamp, or a headlamp, a fog lamp, a backward light, a sidelight, a license plate light, a taillight, a turn signal lamp, a hazard flasher lamp installed at the outside of a vehicle, or an indoor lighting lamp installed at the inside of a vehicle.

However, the most of lighting is mainly realized by a method of increasing luminance of a surface light source by applying a member such as a light guide plate for enabling the efficient transmission of light.

For example, FIG. 1 roughly illustrates a structure of a convention lighting unit used in a vehicle.

As illustrated in FIG. 1, a conventional light guide for a vehicle includes: a light source 10 emitting light at a certain fixed emitting angle; and a total reflection part 20 adopted to fully reflect light emitted from the light source 10, wherein the total reflection part 20 generally has a case form with an internal space, and is configured so that a first total reflection surface 21 and a second total reflection surface 22 can be formed, and as illustrated in FIG. 1, dispersion points 30 for dispersing light are formed inside the total reflection part 20 so that the light passing through the total reflection part 20 can be dispersed by the dispersion points, and can be then emitted to the outside. That is, the light incident from the light source 10 to the total reflection part 20 travels along the total reflection part 20 through a process of being reflected by the first and second total reflection surfaces 21, 22 of the total reflection part 20, and the light is dispersed by the dispersion points 30 and is emitted to a direction to perpendicular to a traveling direction. However, since the conventional light guide for a vehicle is mounted to a rear lamp of a vehicle body in a general form, it is problematic in that there is a limit in selecting a vehicle based on a design in terms of buyers in a state of aesthetic impression being reduced.

In order to overcome this limit, as shown in (B) of FIG. 1, the structure of a lighting unit for a vehicle including: a bezel 1 formed in a housing form in a rear lamp of a vehicle; a light source 2 inserted into the bezel 1 and emitting light; a light guide panel 3 adopted to guide light emitted from the light source 2, and having one side into which printed patterns 3-1 are inserted, namely, the structure for increasing a design effect by providing the printed patterns inside the lighting unit, has been suggested. However, such a structure is problematic in that since the printed patterns 3-1 are used, light extraction efficiency is reduced, and reliability of a printing ink is also reduced. Also, the structure has a limit in satisfying luminous intensity and light distribution because the light source is inserted into merely one side.

DISCLOSURE OF INVENTION

Technical Problem

Accordingly, the present invention has been made keeping in mind the above problems. An aspect of embodiments of the present invention provides a lighting unit for a vehicle that enables composite beams to be implemented in various light colors by changing the light colors implemented in a light emitting region, or by interference between light sources.

In particular, since a lighting unit for a vehicle according to a first embodiment of the present invention is configured such that LEDs emitting beams having different colors are mounted to a light source module passing through a central portion of a light guide module so that two integrated beams can be implemented in one light source lamp, a bezel necessarily required for lighting may be removed. Thus, a surface light source for a vehicle without a bezel can be implemented so that a mechanical limit can be reduced, and thus the degree of freedom in design, diversification, and marketability can be increased.

Furthermore, according to a second embodiment of the present invention, an individual beam is supplied to a specific region of a light emitting surface of a lighting unit for a vehicle using a patterned optical fiber so that a tail lamp, or a unique symbol, logo, and image of the vehicle can be implemented, thereby implementing differentiation in design of a rear lamp for a vehicle, and enabling an increase in marketability.

Also, according to a third embodiment of the present invention, a light source module including a light guide member having a double lamination structure is formed so that various light colors can be generated by interference among beams emitted from two light sources, and a lighting unit capable of increasing the degree of freedom in design can be provided.

Solution to Problem

In order to solve the problems described above, according to an aspect of a first embodiment of the present invention, a lighting unit for a vehicle may include: a light guide module including a plurality of mounting grooves; and a light source module including a plurality of LED light sources inserted into the mounting grooves, wherein each of the LED light sources has at least two different LEDs. Thus, two beams are implemented in one integrated light so that a tail light, a stop light and a turn signal light can be integrated, and thus the degree of freedom in design, and efficiency and process costs can be increased.

Also, according to another aspect of a second embodiment of the present invention, a lighting unit for a vehicle may include: a light source module; a light guide module adopted to guide light emitted from the light source module forwards; and an optical fiber module inserted into the light guide module, and including an optical fiber having a light reflection pattern region implemented at an external surface.

Moreover, according to a further aspect of a third embodiment of the present invention, a surface lighting unit for a vehicle may include: a first light source module including a first light guide member adopted to guide light emitted from a first light source; and a second light source module disposed on the first light guide member, and including a second light guide member adopted to guide and emit light emitted from a second light source and the light guided by the first light guide member.

Advantageous Effects of Invention

According to some embodiments of the present invention, a composite light unit capable of implementing various light colors by changing light colors implemented in a light emitting region or by interference between light sources can be provided.

In particular, according to a first embodiment of the present invention, LEDs emitting beams having different colors are mounted to a light source module passing through a central portion of a light guide module so that two integrated beams can be implemented in one light source lamp.

Also, according to the first embodiment of the present invention, a bezel necessarily required for lighting is removed so that a surface light source for a vehicle without a bezel can be implemented, and thus a mechanical limit can be reduced, and the degree of freedom in design, diversification, and marketability can also be increased. Furthermore, two beams are implemented by one integrated light so that a taillight, a stoplight, and a turn signal lamp can be integrated, thereby enabling a reduction in costs. In particular, in order to satisfy a light distribution property, optical patterns are arranged on a surface of the light guide module so that light efficiency can be increased, and a shape of mounting grooves into which light sources are inserted is adjusted so that the problem of a defect in ejection generated upon injection of the light guide module can be solved. Moreover, when LEDs are used as light sources, a light shielding pattern for preventing hot spots of the light guide module from being generated from the LEDs is provided so that reliability can be increased.

Also, according to a second embodiment of the present invention, an individual beam is supplied to a specific region of a light emitting surface of a lighting unit for a vehicle using a patterned optical fiber so that a tail lamp, or a unique symbol, logo, and image of the vehicle can be implemented, thereby implementing differentiation in design of a rear lamp for a vehicle, and enabling an increase in marketability.

Furthermore, according to a third embodiment of the present invention, a light source module including a light guide member having a double lamination structure is formed so that various light colors can be generated by interference among beams emitted from two light sources, the degree of freedom in design can be increased.

BRIEF DESCRIPTION OF DRAWINGS

FIG. 1 is a conceptual view illustrating the structure of a conventional lighting unit for a vehicle;

FIG. 5 is a conceptual view illustrating the structure of a light guide module according to the first embodiment of the present invention of FIG. 3;

FIGS. 6 to 9 illustrate various implementation examples of a mounting groove according to the first embodiment of the present invention;

FIG. 10 is a conceptual view illustrating a configuration of a diffusion member disposed at an upper portion of the light guide module with respect to the structure of the lighting unit of FIG. 3 according to the first embodiment of the present invention;

FIG. 11 is a conceptual view illustrating a configuration of a lighting unit for a vehicle according to a second embodiment of the present invention;

FIG. 12 is a conceptual view of a subject matter illustrating a cross section taken along lines A-A' of FIG. 11;

FIG. 13 is a conceptual view illustrating a configuration of an optical fiber module of FIG. 11;

FIG. 14 is a conceptual view illustrating another configuration of the optical fiber module of FIG. 11;

FIG. 15 illustrates another implementation example of the lighting unit for a vehicle the present invention;

FIG. 16 is a conceptual view illustrating a cross section taken along lines A-A' of FIG. 15; and FIGS. 17 to 20 are conceptual views illustrating various implementation examples according to a third embodiment of the present invention.

BEST MODE FOR CARRYING OUT THE INVENTION

Figure 2:
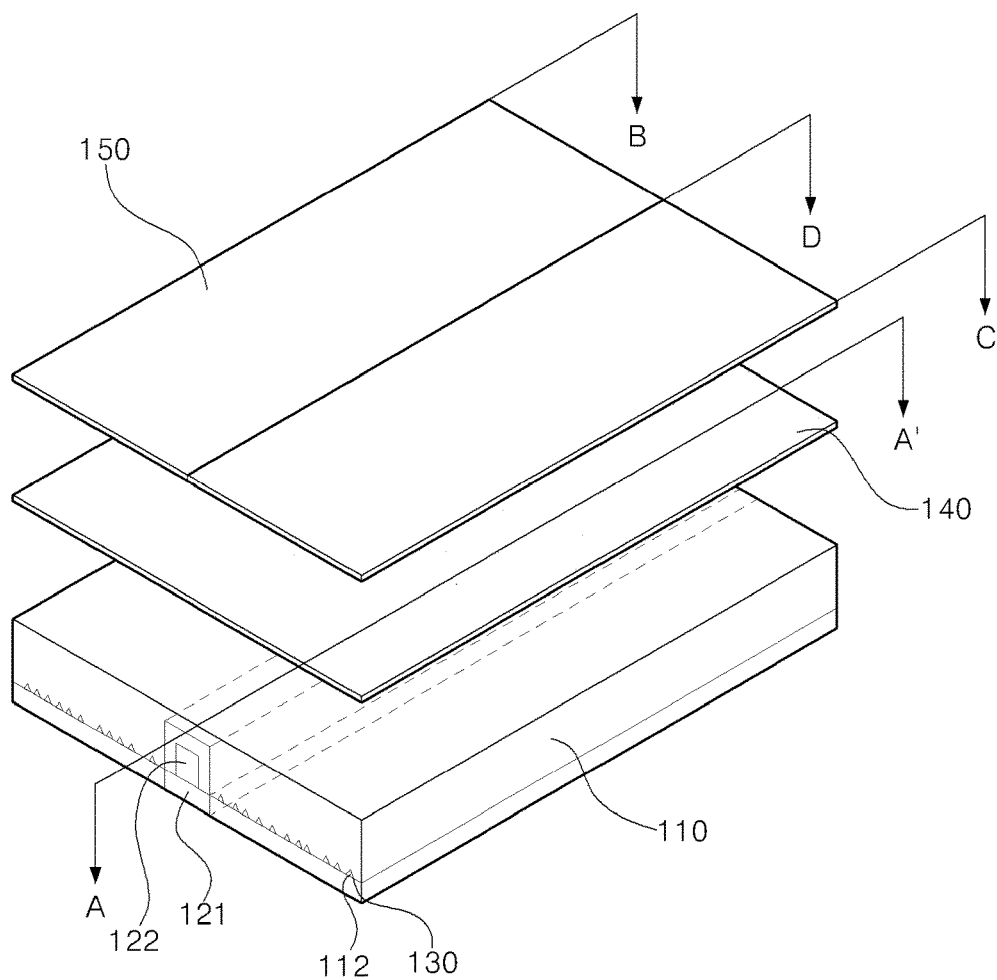
FIG. 2 conceptually illustrates a perspective view of a lighting unit according to a first embodiment of the present invention.

Hereinafter, the configurations and operations according to embodiments of the present invention will be described in detail with reference to the accompanying drawings. The present invention may, however, be embodied in different forms and should not be construed as limited to the embodiments set forth herein. In the explanation with reference to the accompanying drawings, regardless of reference numerals of the drawings, like numbers refer to like elements through the specification, and repeated explanation thereon is omitted. Terms such as a first term and a second term may be used for explaining various constitutive elements, but the constitutive elements should not be limited to these terms. These terms is used only for the purpose for distinguishing a constitutive element from other constitutive element.

With regard to a lighting unit for implementing surface light emission from a single light emitting surface, the Embodiments of the present invention are intended to provide a lighting unit for a vehicle capable of implementing a light emitting region in which at least two light colors are displayed, or different light colors are realized, and capable of implementing a function of local light emission.

1. First Embodiment

Figure 3:
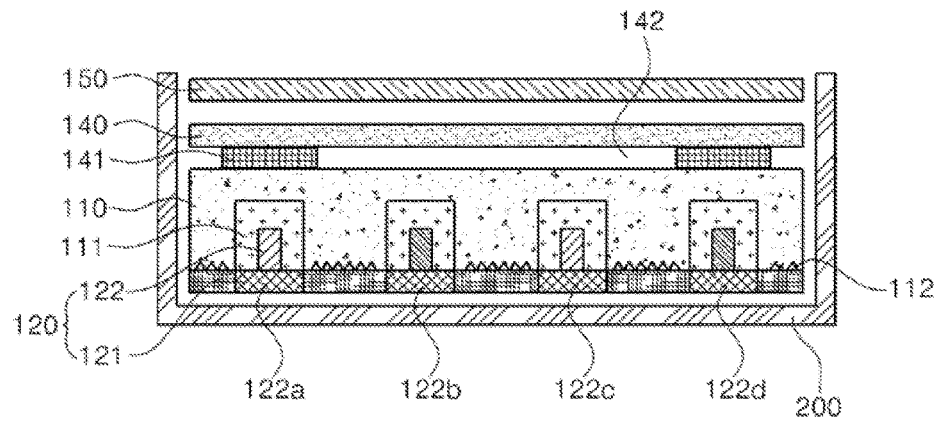
FIG. 3 is a conceptual view illustrating a cross section taken along lines A-A' of FIG. 2.

FIG. 2 conceptually illustrate a perspective view of a lighting unit according to a first embodiment of the present invention, and FIG. 3 is a conceptual view illustrating a cross section taken along lines A-A' of FIG. 2.

Referring to FIGS. 2 and 3, a lighting unit 300 according to the present embodiment of the invention includes: a light guide module 110 including a plurality of mounting grooves 111; and a light source module 120 including a plurality of LED light sources 122 inserted into the mounting grooves 111, respectively wherein each of the LED light sources 122 has at least two LEDs having different light emitting directions. That is, the lighting unit 300 according to the present embodiment of the invention is characterized in that the light sources are insertedly connected to an inner portion of the light guide module 110, and the light sources mounted on the light source module 120 are disposed to have different light emitting directions.

To do so, the light source module 120 may be disposed between the outermost portions B, C of the light guide module 110 and a central portion D. That is, as illustrated in FIG. 2, the light source module may be disposed at the central portion D of the light guide module 110, or at a position which slightly deviates from the central portion. In this case, the light source module 120 includes the printed circuit board 121 to which the light source 122 is mounted. In particular, the LEDs having different light emitting directions may be mounted to the printed circuit board 121 to cross each other.

In particular, as illustrated in FIG. 3 showing a cross section taken along lines A-A' of FIG. 2, the LEDs 122 may be disposed so that a plurality of first LED groups (122a, 122c) emitting light in a first direction, and second LED groups (122b, 122d) emitting light in a second direction can emit light beams having different colors. For example, the LEDs may be disposed so that the first LED groups are red, and the second LED groups are amber. As one example, as illustrated in FIG. 3, when the red and amber LEDs are alternately disposed, the red LEDs may emit the light beams in the first direction, and the amber LEDs may emit the light beams in the second direction.

Figure 4:
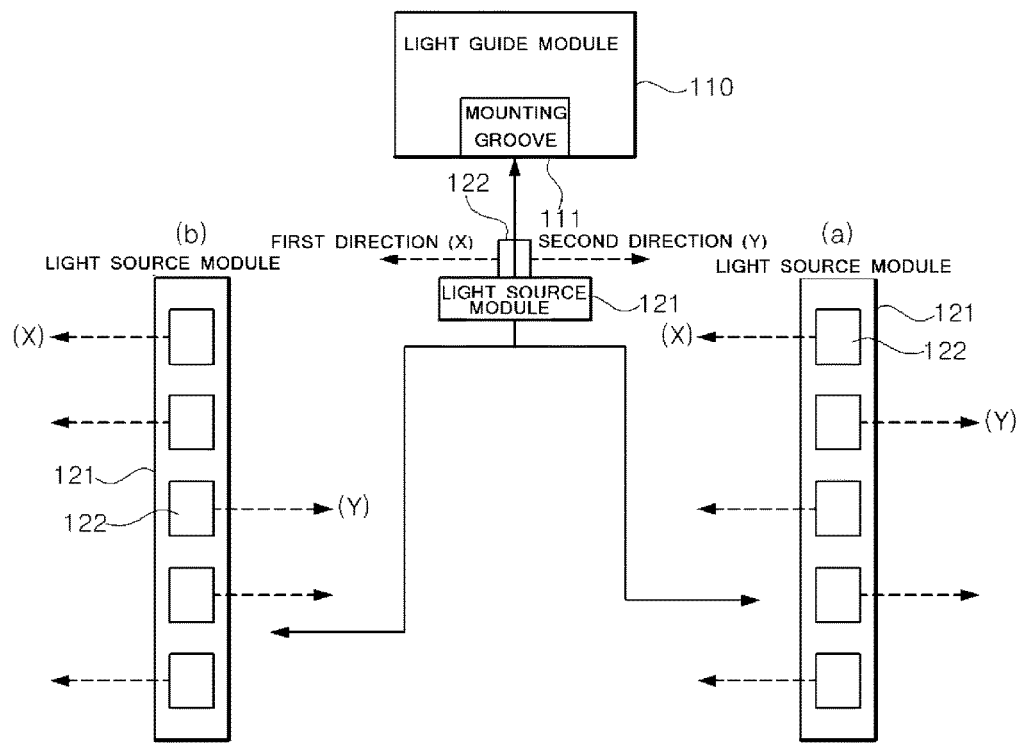
FIG. 4 is a conceptual view illustrating a first example of an arrangement of a light source module according to the first embodiment of the present invention.

With regard to this arrangement of the cross structure, as illustrated in FIG. 4, (A) the LEDs may be individually alternately disposed to have different light emitting directions, or (B) at least two LEDs may be disposed to emit the light beams in the first direction or the second direction.

That is, in the present embodiment of the invention, the LEDs emitting light beams having different colors are mounted to the light source module passing through the central portion of the light guide module so that one light source lamp can implement two integrated light beams. When such a structure is applied to lighting for a vehicle, by removing a bezel which is necessarily required for the lighting for a vehicle, a surface light source for a vehicle without the bezel is not present can be implemented. Thus, a mechanical limit can be reduced, the degree of freedom in design can be improved, and diversification in design can be realized, thereby enabling an increase of a commercial value. Furthermore, since two light beams are implemented by one integrated lighting lamp, a taillight, a stoplight, and a turn signal lamp may be integrated, thereby enabling a reduction in costs. For example, when the LEDs are disposed such that the first LED groups are red, and the second LED groups are amber, a red flasher and an amber flasher may be implemented in one lighting unit, and signals by a taillight, a stoplight, and a turn signal lamp of a vehicle may be implemented in one lighting unit.

Also, in the present embodiment of the invention, as illustrated in FIG. 3, the lighting unit may further include a reflection member 130 disposed between the printed circuit board 121 and a surface of the light guide module having the mounting grooves 111. The reflection member 130 is formed of a material having high reflection efficiency and reflects the light emitted from the light source module 120 upwards so as to function to reduce optical loss. This reflection member 130 may have a film form and may be formed using a synthetic resin dispersively containing a white pigment in order to implement a reflection property and dispersion property of light. For example, examples of the white pigment may include, not being limited to, titanium dioxide, aluminum oxide, zinc oxide, lead carbonate, barium sulfate, calcium carbonate, and the like. Examples of the synthetic resin may include, not being limited to, polyethylene terephthalate, polyethylene naphthalate, acrylic resin, polycarbonate, polystyrene, polyolefin, cellulose acetate, weather resistant vinyl chloride, and the like. Reflection patterns may be formed on a surface of the reflection member 130 and may function to uniformly transmit light to a diffusion member 140 by scattering and diffusing the incident light. The reflection patterns may be formed by printing the reflection patterns on the surface of the reflection member 130 using a reflective ink containing any one of $TiO_2$, $CaCo_3$, $BaSO_4$, $Al_2O_3$, Silicon, and PS without being limited thereto.

FIG. 5 is a conceptual view illustrating a structure of the light guide module 110 according to the embodiment of the present invention of FIG. 3. Referring to FIGS. 3 and 5, the light guide module 110 according to the embodiment of the present invention has the plurality of mounting grooves 111, and the LED light sources 122 are inserted into the mounting grooves 111. In the present invention, the LED light sources 122 may be a side view type. In particular, the light guide module 110 may form first optical patterns 112 formed on the surface of the light guide module. The first optical patterns may be implemented as rugged patterns in an intaglio type that are directly formed on the surface of the light guide module. A cross section of each of the rugged patterns may be adjusted in various shapes, such as a triangular shape, a semicircular shape, a pyramid shape, a horseshoe-like shape, and the like so that a light distribution property can be improved.

Also, as illustrated in FIG. 5, each of the mounting grooves 111 may be implemented in a steric structure in a rectangular parallelepiped form, or a hemispherical structure. As illustrated in FIG. 6, each of the mounting grooves is composed of an upper surface of a hole formed in an inner direction of the light guide module and a lower surface and an inner side of an opening structure. The upper surface and the lower surface may have the same width, or the width of the lower surface may be formed larger than that of the upper surface. Also, at least one curvature part having curvature may be formed in an edge part formed by the upper surface and the inner side of the mounting groove. The curvature part may have the radius of curvature R corresponding to ½ or less of a length of a short side of the upper surface of the mounting groove. Of course, the present invention is not limited thereto, and light extraction efficiency can be maximized by the mounting groove having various shapes.

That is, when the lighting unit is applied as a flat plate type surface light source used in a vehicle lamp, as shown in FIG. 7, the mounting groove may have a cross section in a quadrangular shape as illustrated in (A) and (B) of FIG. 7. However, when a portion in which a lamp for a vehicle is disposed is a curved portion, or has a design of a modified bent arrangement and the like, the mounting grooves in a modified shape as shown in FIGS. 8 and 9 are implemented so that light extraction efficiency can be maximized. In this case, each of the mounting grooves may have a height Y corresponding to 1.3 to 1.4 times of a height y of the LED. When the height of the mounting groove is greater than the range, since a thickness of the light guide module is necessarily increased, it is problematic in that a disadvantage is increased in terms of costs.

Furthermore, the mounting groove may have a width X corresponding to 1.1 to 1.2 times of a width x of the LED. When the width of the mounting groove is larger than such a width, the loss of light emitted from the light source is increased so that efficiency can be reduced.

In the case of FIG. 8, a structure in which a side is inclined with respect to the structure of the mounting groove of FIG. 7 may be implemented. In this case, a gradient in which an end of a lower width extends from an upper edge portion of the mounting groove may be formed in a range that satisfies 5 to 10°. When the gradient is beyond the range, optical loss is increased.

Also, in the case of FIG. 9, as an example, in the basic structure of the mounting groove of FIG. 7, the side may have curvature resulting from rounding treatment. In order to maximize light efficiency, a radius of an imaginary circle formed by the curvature formed by an outer edge of the side may be formed in a range corresponding to 1.1x~1.4y times based on the width x and the height y of the LED light source.

FIG. 10 illustrates a configuration of the diffusion member 140 disposed at an upper portion of the light guide module 110 with regard to the structure of the lighting unit of FIG. 3 according to the embodiment of the present invention.

That is, the lighting unit according to the present embodiment of the present invention may further include the diffusion member 140 at an upper side of the light guide module 110. In this case, a spaced part 142 may be formed between the light guide module 110 and the diffusion member 140. The lighting unit may further include second optical patterns 141 for a light shielding or reflection purpose formed on a surface of the diffusion member or the light guide module.

The diffusion member 140 functions to uniformly diffuse light emitted through the light guide module 110 all over the surface. In general, the diffusion member 220 may be generally formed of acryl resin, but is not limited thereto. In addition to this, the diffusion member may be made all materials for enabling a diffusion function, namely, high transmission plastic, such as PS (Polystyrene), PMMA (Polymethyl Methacrylate), a COC (Cyclic Olefin Polymer), PET (Polyethylene Terephthalate), and resin.

The second optical patterns 141 basically function to prevent light emitted from the light source module 120 from being focused. In order to prevent an optical property from being reduced or a yellowish effect from being generated due to the excessive intensity of light, a part of the second optical patterns 141 may be formed as light shielding patterns so as to implement a light shielding effect. The light shielding patterns may be printed on an upper surface of the light guide module 110 using a light shielding ink, or may be printed on an upper surface or a lower surface of the diffusion member.

The second optical patterns 141 is implemented so as to function to partially shield and diffuse light rather than to completely shield the light, so that a light shielding level and diffusivity can be adjusted by one optical pattern. Furthermore, more specifically, each of the optical patterns 141 according to the present invention may be implemented in an overlapping print structure of composite patterns. The overlapping print structure refers to a structure in which one pattern is formed, and another pattern form is printed thereon. As one example, in implementing the optical patterns 141, each of the optical patterns may be implemented in an overlapping structure of the diffusion pattern and the light shielding pattern, the diffusion pattern being formed on a lower surface of a polymer film in a light emitting direction using a light shielding ink containing at least one material selected from among $TiO_2$, $CaCO_3$, $BaSO_4$, $Al_2O_3$, and silicon, and the light shielding pattern being formed using a light shielding ink containing Al or a mixture of Al and $TiO_2$.

That is, the diffusion pattern is white-printed on the surface of the polymer film, and thereafter, the light shielding pattern is formed thereon. Also, each of the optical patterns may be formed in a double structure in a reverse order. Of course, it is obvious that such a design for forming these patterns may be variously changed in consideration of the efficiency, intensity, and shielding rate of light. Also, the structure of the optical patterns may be formed in a triple structure which is configured such that, in a sequential layer structure, the light shielding pattern corresponding to a metal pattern is formed in a middle layer, and the diffusion pattern is formed at an upper portion and a lower portion thereof. In such a triple structure, the materials described above may be used. As one preferred example, through the triple structure which is configured such that one of the diffusion patterns is implemented using $TiO_2$ having an excellent refractive index, another of the diffusion pattern is implemented using both $CaCO_3$ and $TiO_2$ having excellent light stability and color sensitivity, and the light shielding patterns are implemented using Al having an excellent concealing property, light efficiency and uniformity can be secured. In particular, since $CaCO_3$ functions to reduce the exposure of yellowish light, it enables white light to be finally implemented so that light having more stable efficiency can be implemented. In addition to $CaCO_3$, inorganic materials having a large particle size, such as $BaSO_4$, $Al_2O_3$, Silicon beads, and the like, may be also utilized. Moreover, in terms of light efficiency, the optical patterns 160 may be formed by adjusting a pattern density such that the pattern density is reduced as the optical patterns are gradually far away from a light emitting direction of the LED light source.

Moreover, the spaced part 142 formed between the diffusion member 140 and the light guide module 110 may increase uniformity of the light supplied to the diffusion member 140 by passing through the light guide module 110, thereby implementing an increase in uniformity of the light diffused and emitted by passing through the diffusion member 140. At this time, in order to minimize the deviation of light passing through the resin layer 150, a thickness of the spaced part 142 may range from more than 0 mm to 20 mm. An outer lens disposed at an upper portion of the diffusion member may be further included.

Moreover, even though the light guide module 110 according to the first embodiment of the present invention has mounting grooves, and the LED light sources are mounted to the mounting grooves, respectively, in addition to a plate structure having a certain hardness, the light guide module 110 may be also configured by applying a resin material having flexibility. In a case where the resin material having flexibility is implemented as the light guide module, when the LED light sources are disposed to be inserted into the light guide module, the LEDs and the resin material may be implemented in a buried type having a structure in which the LEDs and the resin material are closely attached. Also, the LEDs and the resin material may be implemented in a buried type having a structure in which the LEDs and the resin material are spaced apart from each other by a predetermined portion. The resin material may be composed of a high heat resistance ultraviolet curable resin containing an oligomer. At this time, a content of the oligomer may range from 40 to 50 parts by weight with respect to the total weight of the ultraviolet curable resin. Also, urethane acrylate may be used as the ultraviolet curable resin without being limited thereto. In addition to this, at least one material of epoxy acrylate, polyester acrylate, polyether acrylate, polybutadiene acrylate, and silicon acrylate may be used as the ultraviolet curable resin.

In particular, when urethane acrylate is used as an oligomer, two types of urethane acrylate are used in a state of being mixed so that different physical properties can be simultaneously implemented.

For example, isocyanate is used during synthesizing urethane acrylate, and physical properties (a yellow index, weather resistance, chemical resistance, and the like) of the urethane acrylate are determined by the isocyanate. At this time, one kind of urethane acrylate is implemented using urethane acrylate type-isocyanate, and is implemented such that PDI (phenylene diisocyanate) or IPDI (isophorone diisocyanate) has an NCO content of 37% (hereinafter referred to as 'the first oligomer'). Another kind of urethane acrylate is implemented using urethane acrylate type-isocyanate, and is implemented such that PDI (phenylene diisocyanate) or IPDI (isophorone diisocyanate) has an NCO content of 3~50% or 25~35% (hereinafter referred to as 'the second oligomer'), so the oligomers according to each embodiment can be formed. The first oligomer and the second oligomer having different physical properties may be obtained by controlling the NCO content. By mixing the first and second oligomers, an oligomer forming the resin material may be implemented. At this time, a weight ratio of the first oligomer in the oligomer may range from 15 to 20, and a weight ratio of the second oligomer may range from 25 to 35.

Meanwhile, the resin material may further include at least one of a monomer and a photo initiator. At this time, a content of the monomer may range from 65 to 90 parts by weight. More specifically, the monomer may be composed of a mixture containing 35 to 45 parts by weight of an IBOA (Isobornyl Acrylate), 10~15 parts by weight of a 2-HEMA (2-Hydroxyethyl Methacrylate), and 15~20 parts by weight of a 2-HBA (2-Hydroxybutyl Acrylate). Moreover, in the case of the photo initiator (i.e., 1-hydroxycyclohexyl phenyl-ketone,Diphenyl), Diphenyl(2,4,6-trimethylbenzoyl phosphine oxide and the like), it may range from 0.5 to 1 parts by weight.

Also, the resin material may be composed of a thermosetting resin having high heat resistance. Specifically, the resin material may be composed of a thermosetting resin containing at least one of a polyester polyol resin, an acryl polyol resin, and a hydrocarbon or/and ester solvent. Such a thermosetting resin may further include a heat curing agent for increasing coating strength.

In the case of the polyester polyol resin, a content of the polyester polyol resin may range from 9 to 30% compared to a total weight of the thermosetting resin. Also, in the case of the acryl polyol resin, a content of the acryl polyol may range from 20 to 40% compared to the total weight of the thermosetting resin.

In the case of the hydrocarbon or/and ester solvent, a content thereof may range from 30 to 70% compared to the total weight of the thermosetting resin. A content of the heat curing agent may range from 1 to 10% compared to the total weight of the thermosetting resin. When the resin material is formed of the materials described above, thermal resistance is increased. Thus, even though the resin material is used in a lighting unit from which heat with a high temperature is emitted, a reduction of luminance due to the heat can be minimized, so a lighting unit having high reliability can be provided.

2. Second Embodiment

A lighting unit for a vehicle capable of implementing separate local light emission in a light emitting area of a light guide module according to the second embodiment of the present invention will be hereinafter described.

FIG. 11 is a conceptual view illustrating the configuration of a lighting unit for a vehicle according to the second embodiment of the present invention. Also, FIG. 12 is a conceptual view of a subject matter illustrating a cross section taken along lines A-A' of FIG. 11.

Referring to FIGS. 11 and 12, the lighting unit for a vehicle according to the second embodiment of the invention includes: a light source module 120; a light guide module 110 adopted to guide light emitting from the light source module forward; and an optical fiber module 200 inserted into the light guide module 110 and including an optical fiber with a light reflection region implemented at an external surface. In this case, the optical fiber module 200 may have the optical fiber inserted into the light guide module, and aside from the light source module 120, the light guide module 110 may implement local light emission using the light provided through the optical fiber.

Specifically, the light source module 120 according to the embodiment of the present invention may include the printed circuit board 121 for mounting the first light source 122 that emits light from an inner side or an outer side of the light guide module 110 to an inner portion of the light guide module. With regard to the configuration illustrated in FIG. 2 or 3, the configuration in which the light source module 120 is mounted to the inner portion of the light guide module 110 has been described. However, unlike this, the light source module itself may be disposed to supply light from the outside of a side of the light guide module 110. The light source 122 may be composed of a side view type light emitting diode. That is, the light emitting diode having a structure in which light is emitted toward a side rather than being straightly emitted upwards may be used as the light emitting unit of the present invention. Accordingly, in the lighting unit of the present invention, since the light source module composed of the side view type light emitting diode is disposed in a direct type, the light guide module capable of implementing a light diffusion and reflection function is utilized for diffusing and guiding light in a direction of the diffusion member which will be described later, so that the number of light emitting units can be reduced and an entire weight and thickness of the illuminating device can be remarkably reduced.

The printed circuit board 121 means a board in which a circuit pattern is formed on a substrate, namely, a printed circuit board. In particular, in the present invention, in order to secure certain flexibility, the printed circuit board may be formed as a flexible printed circuit board (FPCB).

Referring to FIG. 13, FIG. 13 is a conceptual view illustrating the optical fiber module 200 described through FIG. 11. Referring to FIGS. 11 and 13, the optical fiber module 200 may be inserted into the light guide module 110, and may include an optical fiber 210 in which a light reflection pattern region 213 is implemented on an external surface. Specifically, aside from the fact that surface light emission is implemented over an entire volume of the light guide module 110, the optical fiber module 200 may include the printed circuit board 221 for mounting the second light source 222 emitting light from one end or the other end of the optical fiber 210 to an inner portion of the optical fiber, so that the concentration and efficiency of light can be increased by a reflection structure 230 formed at an outer periphery of the second light source 222. In particular, the optical fiber 210 is implemented as a core 212 of an inner portion thereof, and a clad of an outer portion thereof. The optical fiber may further include the light reflection pattern region 213 in which a rugged pattern region formed on a surface of the clad of an opposite surface adjacent the light guide module 110 is formed. Light emitted from the light source 222 travels to be fully reflected inside the optical fiber 210 through the light reflection pattern region 213, and the traveling light is reflected through the light reflection pattern region 213 so as to be emitted to an upper portion of the optical fiber. In this case, as illustrated in FIG. 11, the light is locally provided to a display region T formed on an upper surface of the light guide module 110 so that a desired signal, image, logo and the like can be realized aside from the light source module 110.

FIG. 14 illustrates another implementation example of the optical fiber module 200 according to the embodiment of the present invention described through FIG. 13. A company logo L is displayed in a display region T of the light guide module so that a function of emitting the logo itself can be performed, and the optical fiber module may be implemented such that a light source for providing light to the optical fiber is disposed at both sides of the optical fiber.

FIG. 15 is a perspective view illustrated for explaining an example for increasing light extraction efficiency of the lighting unit for a vehicle according to the second embodiment of the present invention, and FIG. 16 illustrates a cross-sectional view of the region taken along lines A-A' of FIG. 15.

As illustrated in FIGS. 15 and 16, the lighting unit for a vehicle according to the present invention may have the optical fiber module 200 inserted into the light guide module 110 and having the light reflection pattern region implemented at an external surface, and may further include the diffusion member 140 disposed on an upper surface of the light guide module 110.

The light guide module 110 according to the embodiment of the present invention has the plurality of mounting grooves 111, and the LED light sources 122 are inserted into the mounting grooves 111. In the present invention, the LED light sources 122 may be a side view type. In particular, the light guide module 110 may form first optical patterns 112 formed on the surface of the light guide module. The first optical patterns may be implemented as rugged patterns in an intaglio type that are directly formed on the surface of the light guide module. A cross section of each of the rugged patterns may be adjusted in various shapes, such as a triangular shape, a semicircular shape, a pyramid shape, a horseshoe-like shape, and the like so that a light distribution property can be improved. Also, as illustrated in FIG. 15, the mounting groove 111 may be implemented in a steric structure in a rectangular parallelepiped form, or a hemispherical structure. Each of the mounting grooves 111 is composed of an upper surface of a hole formed in an inner direction of the light guide module and a lower surface and an inner side of an opening structure. The upper surface and the lower surface may have the same width, or the width of the lower surface may be formed larger than that of the upper surface. Also, at least one curvature part having curvature may be formed in an edge part formed by the upper surface and the inner side of the mounting groove. The curvature part may have the radius of curvature R corresponding to ½ or less of a length of a short side of the upper surface of the mounting groove. Of course, the present invention is not limited thereto, and light extraction efficiency can be maximized by the mounting groove having various shapes.

The diffusion member 140 is disposed at an upper portion of the light guide module 110, and in this case, a spaced part 142 may be formed between the light guide module 110 and the diffusion member 140. Second optical patterns 141 for a light shielding or reflection purpose formed on a surface of the diffusion member or the light guide module may be further included.

The diffusion member 140 functions to uniformly diffuse light emitted through the light guide module 110 all over the surface. In general, the diffusion member 220 may be generally formed of acryl resin, but is not limited thereto. In addition to this, the diffusion member may be made all materials for enabling a diffusion function, namely, high transmission plastic, such as PS (Polystyrene), PMMA (Polymethyl Methacrylate), a COC (Cyclic Olefin Polymer), PET (Polyethylene Terephthalate), and resin.

The second optical patterns 141 basically function to prevent light emitted from the light source module 120 from being concentrated. In order to prevent an optical property from being reduced or a yellowish effect from being generated due to the excessive intensity of light, a part of the second optical patterns may be formed as light shielding patterns so as to implement a light shielding effect. The light shielding patterns may be printed on an upper surface of the light guide module 110 using a light shielding ink, or may be printed on an upper surface or a lower surface of the diffusion member.

The second optical patterns 141 is implemented so as to function to partially shield and diffuse light rather than to completely shield the light, so that a light shielding level and diffusivity can be adjusted by one optical pattern. Furthermore, more specifically, each of the second optical patterns according to the embodiment of the present invention may be implemented in an overlapping print structure of composite patterns. The overlapping print structure refers to a structure in which one pattern form is formed, and another pattern form is printed thereon. As one example, in implementing the second optical patterns 141, each of the second optical patterns may be implemented in an overlapping structure of the diffusion pattern and the light shielding pattern, wherein the diffusion pattern is formed on a lower surface of a polymer film in a light emitting direction using a light shielding ink containing at least one material selected from among $TiO_2$, $CaCO_3$, $BaSO_4$, $Al_2O_3$, and silicon, and the light shielding pattern is formed using a light shielding ink containing Al or a mixture of Al and $TiO_2$.

That is, the diffusion pattern is white-printed on the surface of the polymer film, and thereafter, the light shielding pattern is formed thereon. Also, the optical patterns may be formed in a double structure in a reverse order. Of course, it is obvious that such a design for forming these patterns may be variously changed in consideration of the efficiency, intensity, and shielding rate of light. Also, the structure of the optical patterns may be formed in a triple structure which is configured such that, in a sequential layer structure, the light shielding pattern corresponding to a metal pattern is formed in a middle layer, and the diffusion pattern is formed at an upper portion and a lower portion thereof. In such a triple structure, the materials described above may be used. As one preferred example, through the triple structure which is configured such that one of the diffusion patterns is implemented using $TiO_2$ having an excellent refractive index, another of the diffusion pattern is implemented using both $CaCO_3$ and $TiO_2$ having excellent light stability and color sensitivity, and the light shielding pattern is implemented using Al having an excellent concealing property, light efficiency and uniformity can be secured. In particular, since $CaCO_3$ functions to reduce the exposure of yellowish light, it enables white light to be finally implemented so that light having more stable efficiency can be implemented. In addition to CaCO3, inorganic materials having a large particle size, such as $BaSO_4$, $Al_2O_3$, Silicon beads, and the like, may be also utilized. Moreover, in terms of light efficiency, the second optical patterns 141 may be formed by adjusting a pattern density such that the pattern density is reduced as the optical patterns are gradually far away from a light emitting direction of the LED light source.

Moreover, the spaced part 142 formed between the diffusion member 140 and the light guide module 110 may increase uniformity of light supplied from the diffusion member 140 by passing through the light guide module 110. As a result, uniformity of the light diffused and emitted by passing through the diffusion member 140 can be increased. At this time, in order to minimize the deviation of light passing through the resin layer 150, a thickness of the spaced part 142 may range from more than 0 mm to 20 mm. An outer lens 150 disposed at an upper portion of the diffusion member may be further included.

Moreover, with regard to the light guide module according to the second embodiment of the present invention, like in the first embodiment described above, even though the light guide module 110 has mounting grooves, and the LED light sources are mounted to the mounting grooves, respectively, in addition to the plate structure having a certain hardness, the light guide module 110 may be also configured by applying a resin material having flexibility. In a case where the resin material having flexibility is implemented as the light guide module, when the LED light sources are disposed to be inserted into the light guide module, the LEDs and the resin material may be implemented in a buried type having a structure in which the LEDs and the resin material are closely attached. Also, the LEDs and the resin material may be implemented in a buried type having a structure in which the LEDs and the resin material are spaced apart from each other by a predetermined portion. The resin material may be composed of a high heat resistance ultraviolet curable resin containing an oligomer. Furthermore, various resin examples described through the first embodiment may be also applied.

The practical implementation example of the lighting unit for a vehicle according to the present invention of FIGS. 8 and 9 described in the first embodiment may be also applied to the lighting unit according to the second embodiment of the present invention described above. The lighting unit for a vehicle according to the second embodiment of the present invention can be applied to a headlight, a vehicle indoor light, a door scuff, a backlight and the like. In addition, the lighting unit of the present invention can be applied to a backlight unit field applied to a liquid crystal display device and can be also applied to all fields regarding illumination which have been developed and commercialized or may be implemented according to technical development in the future.

3. Third Embodiment

Unlike the structures of the first and second embodiments of the present invention, a structure of the third embodiment in which at least two light guide modules are laminated so that various light colors can be realized by interference among beams emitted from the light guide modules will be hereinafter described.

A lighting unit according to the third embodiment of the present invention can implement various light colors through a lamination structure of at least two light source modules supplying light to a light guide member.

FIG. 17 is a conceptual view illustrating the subject matters of a lighting unit for a vehicle according to the third embodiment of the present invention.

Referring to FIG. 17, the lighting unit for a vehicle according to the present invention includes: a first light source module 300 including a first light guide member 330 adopted to guide light emitted from a first light source 320; and a second light source module 400 including a second light guide member 430 adopted to guide and emit light emitted from a second light source 420 and the light guided by the first light guide member 330.

That is, the lighting unit may be implemented in a structure in which at least two light source modules are disposed in a state of being laminated so that light emitted from the light source module disposed at a lower portion can be guided to the light source module disposed at an upper portion, thereby causing a change in color of light beams.

As illustrated in FIG. 18, the first light source module 300 may be disposed on one side or both sides of the first guide member 330, and many include a light source 320 mounted to a printed circuit board 310. The first light guide member 330 is provided at a side of the printed circuit board 310, thereby diffusing and guiding light emitted from the light source 320 to the second light guide member 430 placed at an upper portion. The light guide member 330 may be a resin layer for replacing a light guide plate, as well as a conventional light guide plate.

The printed circuit board 310 means a board in which a circuit pattern is formed on substrate, namely, a printed circuit board. In the present invention, the printed circuit board may be a printed circuit board 310 made of a transparent material. In the case of a conventional lighting unit, as an FR4 printed circuit board is used as a printed circuit board, the convention lighting unit is non-transparent. On the contrary, in the present invention, since a transparent PET printed circuit board is used, a transparent lighting unit may be provided. Also, in the present invention, in order to secure certain flexibility, the printed circuit board may be formed with a flexible printed circuit board. A side view type light emitting diode or a top view type light emitting diode (LED) may be applied as the light source 320.

The light emitted and guided into the first light guide member 330 is diffused and reflected from the first light guide member so that the light is guided upwards. To do so, reflection patterns 331 may be implemented on one surface of the first guide member 330, and may be implemented as engraved patterns that are directly inwardly rugged. Moreover, in order to prevent the light emitted from the first light source 320 from being leaked to the outside, the reflection member 340 may be further disposed at a lower portion of the first light guide member 330 so that the light can be reflected upwards by back reflection. The reflection member 340 may be a sheet made of any one material of a transparent PET (polyethylene terephthalate) sheet, a white PET sheet, and an Ag sheet. Furthermore, the reflection member is formed in a structure in which the reflection patterns formed using any one of $TiO_2$, $CaCO_3$, $BaSO_4$, $Al_2O_3$, Silicon, and PS are printed on a surface of the reflection member 340 so that reflectance can be increased. Also, this reflection member may have a film form and may be formed using a synthetic resin dispersively containing a white pigment in order to implement a reflection property and dispersion property of light. For example, examples of the white pigment may include, not being limited to, titanium dioxide, aluminum oxide, zinc oxide, lead carbonate, barium sulfate, calcium carbonate, and the like. Examples of the synthetic resin may include, not being limited to, polyethylene terephthalate, polyethylene naphthalate, acrylic resin, polycarbonate, polystyrene, polyolefin, cellulose acetate, weather resistant vinyl chloride, and the like. Furthermore, the reflection pattern is formed in a structure in which a plurality of protruding patterns is provided. In order to increase a scattering effect of light, the reflection pattern may have a dot pattern-like shape, a prism shape, a lenticular shape, a lens shape or a combination shape thereof, but is not limited thereto. Also, a cross section of the reflection pattern may have various shapes, such as a triangular shape, a quadrangular shape, a semicircular shape, a sinusoidal shape, and the like.

The light emitted from the first light source 320 is diffused and reflected in the first light guide member 300 so that the light can be emitted to the second light guide member 430 of an upper layer. In this case, the light penetrating the first light guide member 300 directly enters the second light guide member 430 without a separate separation member between the first light guide member 330 and the second light guide member 430 so that a change in color of light beams can be implemented by interference and mixing effects among light beams generated from the second light guide member 330. Of course, the second light source 430 supplying light to the second light guide member 430 may be also disposed on one side or both sides of the second light guide member 330. The light of the second light source 430 emitted from the second light guide member 430 is diffused or reflected in the second light guide member 430 so that the light can be guided forwards. In this case, the reflection patterns 431 having an intaglio structure may be also implemented in the second guide member 430. In this case, the light leaked to a lower surface of the second light guide member 430 is reflected or diffused from the first light guide member 330 again so as to travel upwards.

Also, in the structure of FIG. 17, a transflective reflection member 440 adopted to partially transmit light passing through the first guide member to the second light guide member and to partially reflect the light emitted from the second light source may be further included between the first light guide member 330 and the second light guide member 430. In the structure of FIG. 18, when there is no separate member between the first light source module 300 and the second light source module 400, light beams between the light guide members may be exchanged or may be reflected. However, in the structure of FIG. 18, the transflective reflection member 440 may be disposed, thereby functioning to partially transmit the light emitted from the first light guide member 300 so that the light can be guided to the second light guide member 430 and functioning to reflect the light in the second light guide member 430 so that the light can be transmitted upwards. In this case, LEDs having different light beam colors may be applied as the first light source 320 and the second light source 420. Moreover, the light guide members may be made of the same material or different materials.

The transflective reflection member 440 may be implemented in a structure in which light transmission patterns are implemented on a basic reflection sheet, such as a transparent PET (polyethylene terephthalate), a white PET (polyethylene terephthalate) sheet, an Ag sheet and the like, so that the transflective reflection member can have a light transmittance in the range of $0\% < T < 100\%$.

The light transmission patterns may adjust transmittance by forming a plurality of fine holes or fine slits for light transmission, through-type patterns on the reflection member, or a transflective material layer, or may adjust transmittance by implementing a region formed by only a semi-transmission material layer so that desired transmittance can be implemented in a light transmission region. Such a transflective material layer may be generally formed to have a transmittance of 1 to 99%. Also, a material for forming the transflective material layer may be a major element material (a material composed of only major elements) based on Mo, Si, Ta, W, Al, Cr, Hf, Zr, Me, V, Ni, Nb, Co, and Ti as major elements, a composite material in which at two major elements among the major elements are mixed, or a material in which at least one of $CO_x$, $O_x$, and $N_x$ is added to the major element material or the composite material. The subscripts are natural numbers changed according to combined major elements. For example, any one of $Cr_xO_y$, $Cr_xCO_y$, $Cr_xO_yN_z$, $Si_xO_y$, $Si_xO_yN_z$, $Si_xCO_y$, $Si_xCO_yN_z$, $Mo_xSi_y$, $Mo_xO_y$, $Mo_xO_yN_z$, $Mo_xCO_y$, $Mo_xO_yN_z$, $Mo_xSi_yO_z$, $Mo_xSi_yO_zN$ $Mo_xSi_yCO_zN$, $Mo_xSi_yCO_z$, $Ta_xO_y$, $Ta_xO_yN_z$, $Ta_xCO_y$, $Ta_xO_yN_z$, $Al_xO_y$, $Al_xCO_y$, $Al_xO_yN_z$, $Al_xCO_yN_z$, $Ti_xO_y$, $Ti_xO_yN_z$, and $Ti_xCO_y$, or a combination thereof may be used. The subscripts x, y, and z are natural numbers, and mean the number of chemical elements.

Unlike the structure of FIG. 18 in which the light guide members are disposed to be closely attached to each other, the transflective reflection member may be applied to a case for which specific transmittance for a certain intensity and color of light is required, may function to adjust the transmittance in an allowable range, and may enable the intensity of light to be adjusted in a desired degree.

FIG. 19 illustrates another example according to the present invention.

The structure of FIG. 19 is identical to that of FIG. 17 with respect to the first light source module 300 in a laminated structure of the light guide members which are disposed up and down, but is different from that of FIG. 17, in that the second light source module 400 may be configured such that the second light source 420 is disposed inside the second light guide member 430. In this case, a transparent printed circuit board is applied to the printed circuit board 310 so that the loss of light transmittance can be prevented. Furthermore, in this case, in a lower portion of the transparent printed circuit board, the transflective reflection member (not drawn) may be disposed between the first light guide member 330 and the second light guide member 430. In particular, in this case, a top view type LED may be used as the second light source 420. Of course, in this case, as a plurality of side view type LEDs is adopted, mixing of light colors with the first light source arranged at the lower portion may be implemented.

FIG. 20 illustrates an example showing a structure different from that of FIG. 19.

Unlike in the structure of FIG. 19, in the structure of FIG. 20, the second light source module 400 is formed in the same structure as that of FIG. 17, and the first light source module 300 may be configured such that the first light source 320 is received inside the first light guide member 330. In this case, in order to increase reflection efficiency, when the printed circuit board 310 is disposed at a lower portion of the first guide member 330, it may be implemented as a white printed circuit board having high reflectance.

Of course, even though it is not illustrated in the structure of FIG. 20, the transflective reflection member of FIG. 17 may be disposed between the first light guide member 330 and the second light guide member 430. A top view type LED may be used as the first light source 320. Of course, in this case, a plurality of side view type LEDs may be also adopted so that mixing of light colors with the second light source arranged at an upper portion can be implemented.

In the arrangement structures of FIGS. 17 to 20, a diffusion member 500 may be disposed at an upper portion of the light guide member that is present in the outmost portion, so the diffusion of light can be implemented by the diffusion member 500.

In the examples of FIGS. 17 to 20, the structure in which two light source modules are laminated has been described as a preferred embodiment, but the present invention is not limited thereto. Two or more light source modules may be laminated. In this case, LEDs having different colors are applied to the light sources of the respective light source modules so that various colors can be realized. Furthermore, the transflective reflection member described through FIG. 17 may be inserted into a gap between the light guide members so that transmittance can be adjusted.

The light guide members according to the present invention described through FIGS. 17 to 20 may be made of a resin material. Such a resin material may be composed of an ultraviolet curable resin having high thermal resistance and containing an oligomer, which has been described through the first embodiment. Various types and compositions of resin described through the first and second embodiments may be also applied to the light guide member according to the third embodiment of the present invention.

Also, according to the present invention, since the materials are used in implementing the lighting unit for a vehicle, a thickness of the resin material may be remarkably reduced so that a slimming structure of the entire product can be realized. In particular, thanks to a flexible property of the resin material, it is advantageous in that the lighting unit can be easily applied to a curved surface so that the degree of freedom in a design can be improved, and the lighting unit can be also applied to other lighting for a vehicle or flexible displays having various designs and curves.

In particular, the resin material applied to the first embodiment to the third embodiment may contain a diffusion material having a hollow (or a pore) in an inner portion. The diffusion material may have a form being mixed or diffused with resin forming the resin material and may function to increase a reflection and diffusion property of light. For example, light emitted from the light source to an inner portion of the resin material is reflected and transmitted by the hollow of the diffusion material so that the light can be diffused and concentrated in the resin material, and the diffused and concentrated light can be emitted to one surface (for example, an upper surface) of the resin material. At this time, the reflectance and diffusivity of light are increased by the diffusion material so that an amount and uniformity of the emitted light supplied to the upper surface of the resin material can be increased, and as a result, luminous of the light source modules can be improved.

A content of the diffusion material may be appropriately adjusted for obtaining a light diffusion effect. Specifically, the content of the diffusion material may be adjusted in the range of 0.01 to 0.3% compared to a total weight of the resin material, but is not limited thereto. The diffusion material 41 may be composed of any one selected from among silicon, silica, glass bubble, PMMA (Polymethyl Methacrylate), urethane, Zn, Zr, $Al_2O_3$, and acryl. The particle size of the diffusion material may range from 1 to 20 μm, but is not limited thereto.

The lighting unit according to the present invention may be applied to various lamp devices for which lighting is needed, such as vehicle lamps, home lighting devices, industrial lighting devices and the like. For example, when the lighting unit is applied to a vehicle lamp, it may be also applied to a headlight, an indoor light for a vehicle, a door scuff, a backlight, a stop lamp, a turn signal lamp, a taillight, and the like. In addition, the lighting unit according to the present invention may be also applied to a backlight unit field applied to a liquid crystal display device, and may be also applied to all fields regarding lighting, which have been developed or commercialized, or can be implemented according to technical development in the future.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

INDUSTRIAL APPLICABILITY

A lighting unit according to the present invention may be applied to various lamp devices for which lighting is needed, such as vehicle lamps, home lighting devices, industrial lighting devices and the like. For example, when the lighting unit is applied to a vehicle lamp, it may be also applied to a headlight, an indoor light for a vehicle, a door scuff, a backlight, a stop lamp, a turn signal lamp, a taillight, and the like. In addition, the lighting unit according to the present invention may be also applied to a backlight unit field applied to a liquid crystal display device, and may be applied to all fields regarding lighting, which have been developed or commercialized, or can be implemented according to technical development in the future.

What is claimed is:

1. A lighting unit for a vehicle, comprising:
   a light source module including a plurality of light emitting elements;
   a light guide module adapted to guide light emitted from the light source module and to emit the light;
   an optical pattern provided on a top surface of the light guide module, and
   a reflection member in contact with the light guide module,
   wherein the light source module includes:
      a printed circuit board; and
      a plurality of light emitting elements provided on the printed circuit board,
      wherein the plurality of light emitting elements include a plurality of first light emitting elements that emit light having a first color in a first direction and a plurality of second light emitting elements that emit light having a second color in a second direction opposite to the first direction,
      wherein at least one of the plurality of first light emitting elements and at least one of the plurality of second light emitting elements are provided in a line together between a first lateral surface and a second lateral surface of the light guide module, the first lateral surface opposite to the second lateral surface,
      wherein the first color is different from the second color,
      wherein the light guide module includes a first region and a second region, the first region being an area between the first lateral surface of the light guide module and the plurality of first light emitting elements and the second region being an area between the second lateral surface of the light guide module and the plurality of second light emitting elements, wherein the light having the first color is emitted through the first region and the light having the second color is emitted through the second region, wherein the optical pattern is overlapped with the at least one of the plurality of light emitting elements in a vertical direction, wherein the light guide module has a plurality of grooves concaved from a bottom surface thereof, wherein each of the plurality of light emitting elements is provided in each of the plurality of grooves, wherein the light guide module includes a first portion and a second portion in a third direction in which the plurality of light emitting elements are arranged, wherein the first portion is provided between each of the plurality of grooves and the top surface of the light guide module, wherein the second portion is provided between the reflection member and the top surface of the light guide module, wherein a thickness of the first portion is smaller than a thickness of the second portion, wherein the reflection member is vertically overlapped with an edge region of the optical pattern, and wherein the third direction is in a horizontal direction orthogonal to the first direction and the second direction.

2. The lighting unit of claim 1, wherein each of the plurality of first light emitting elements and each of the plurality of second light emitting elements are provided in each of the plurality of grooves, and wherein at least one of the plurality of first light emitting elements and at least one of the plurality of second light emitting elements are mounted to the printed circuit board to cross each other.

3. The lighting unit of claim 2, wherein each of the plurality of grooves is composed of an upper surface of a hole formed in an inner direction of the light guide module, and a lower surface and an inner side of an opening structure, wherein the upper surface and the lower surface have a same width, or a width of the lower surface is formed larger than a width of the upper surface.

4. The lighting unit of claim 3, wherein at least one curvature part having curvature is formed in an edge part formed by the upper surface and the inner side of each of the plurality of grooves.

5. The lighting unit of claim 4, wherein the curvature part has a curvature radius (R) corresponding to ½ or less of a length of a short side of an upper surface of each of the plurality of grooves.

6. The lighting unit of claim 4, wherein each of the plurality of grooves has a height (Y) corresponding to 1.3 to 1.4 times of a height (y) of each of the plurality of light emitting elements.

7. The lighting unit of claim 6, wherein each of the plurality of grooves has a width (X) corresponding to 1.1 to 1.2 times of a width (x) of each of the plurality of light emitting elements.

8. The lighting unit of claim 7, wherein an end of a lower width in an upper edge portion of each of the plurality of grooves has a gradient of 5 to 10°.

9. The lighting unit of claim 7, wherein a radius of an imaginary circle formed by curvature formed by an outer edge of a side of each of the plurality of grooves is formed in a range corresponding to 1.1x ~1.4y times based on the width x and the height y of each of the plurality of light emitting elements.

10. The lighting unit of claim 4, further comprising a diffusion member provided on the top surface of the light guide module.

11. The lighting unit of claim 10, further comprising a second optical pattern formed on the bottom surface of the light guide module; and wherein the optical pattern is provided between the top surface of the light guide module and the diffusion member, wherein a portion of the optical pattern is overlapped with a portion of the second optical pattern in a vertical direction.

12. The lighting unit of claim 4, wherein the reflection member contacts the bottom surface of the light guide module and lateral surfaces of the printed circuit board, wherein the reflection member includes a reflection pattern having a reflective ink containing any one of $TiO_2$, $CaCO_3$, $BaSO_4$ and $Al_2O_3$.

13. The lighting unit of claim 1, wherein the optical pattern is overlapped with at least one of the plurality grooves, and wherein a width of the optical pattern is greater than a width of each of the plurality of grooves.

14. The lighting unit of claim 1, wherein the plurality of grooves are spaced apart from each other by the second portion of the light guide module.

15. The lighting unit of claim 14, wherein the light guide module is formed of a resin material, and the plurality of light emitting elements and the resin material are directly or indirectly attached.

16. The lighting unit of claim 14, wherein the first color is a single red color, and the second color is a single amber color.

17. The lighting unit of claim 14, wherein the optical pattern includes at least one light shielding ink layer printed on the light guide module, wherein a width of the optical pattern is greater than a width of each of the plurality of grooves, and wherein the optical pattern is a white-printed ink on a surface of a polymer film.

18. The lighting unit of claim 14, wherein the optical pattern includes an overlapped structure of a diffusion pattern and a light shielding pattern, wherein the diffusion pattern is formed on a lower surface of a polymer film in a light emitting direction having a light shielding ink containing at least one material selected from among $TiO_2$, $CaCO_3$, $BaSO_4$, $Al_2O_3$, and the light shielding pattern has a light shielding ink containing Al or a mixture of Al and $TiO_2$.

* * * * *